United States Patent

Rhodes et al.

(10) Patent No.: US 9,046,914 B2
(45) Date of Patent: Jun. 2, 2015

(54) OBJECT TRANSFORMATION OF ARRAYS OF FORMULAS AND VALUES

(75) Inventors: James J. Rhodes, Carmel, NY (US); Hovey Raymond Strong, Jr., San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 13/293,182

(22) Filed: Nov. 10, 2011

(65) Prior Publication Data

US 2013/0124819 A1 May 16, 2013

(51) Int. Cl.
*G06F 12/00* (2006.01)
*G06F 9/44* (2006.01)

(52) U.S. Cl.
CPC ........................................ *G06F 8/00* (2013.01)

(58) Field of Classification Search
CPC . G06F 17/5022; G06F 8/315; G06F 11/1044; G06F 2209/522; G06F 8/24; G06F 8/41; G06F 9/44521; G06F 9/5083; G06F 8/453; G06F 9/465; G06F 15/7867; G06F 2209/463; G06F 9/3897; G06F 12/0646
USPC .......... 711/170, 200, E12.001, 165, 202, 154, 711/171; 707/741, 999.102, 715, 999.101, 707/E17.055, 696, 801; 717/151, 108, 159; 703/2; 1/1
See application file for complete search history.

(56) References Cited

U.S. PATENT DOCUMENTS

| | | | | |
|---|---|---|---|---|
| 5,014,327 A * | 5/1991 | Potter et al. | ................... | 382/220 |
| 5,471,612 A * | 11/1995 | Schlafly | ........................ | 715/210 |
| 5,553,215 A * | 9/1996 | Kaethler | ........................ | 715/219 |
| 6,671,774 B1 * | 12/2003 | Lam et al. | ..................... | 711/112 |
| 7,051,035 B2 * | 5/2006 | Meek | ............................ | 707/812 |
| 7,720,806 B2 * | 5/2010 | Piedmonte | .................... | 707/719 |
| 7,747,939 B2 * | 6/2010 | Thanu et al. | ................... | 715/212 |
| 2007/0011211 A1 * | 1/2007 | Reeves et al. | ................. | 707/203 |
| 2007/0260661 A1 * | 11/2007 | Pelton | .......................... | 708/405 |
| 2009/0315889 A1 * | 12/2009 | Tognola | ........................ | 345/440 |
| 2010/0153295 A1 * | 6/2010 | Cleaveland et al. | .......... | 705/348 |
| 2010/0310188 A1 * | 12/2010 | Richter | ......................... | 382/251 |
| 2012/0047186 A1 * | 2/2012 | Shadmon et al. | ............. | 707/803 |

* cited by examiner

*Primary Examiner* — Yong Choe
*Assistant Examiner* — Edward Waddy, Jr.
(74) *Attorney, Agent, or Firm* — Lieberman & Brandsdorfer, LLC

(57) ABSTRACT

Embodiments of the invention relate to reducing memory required to store an array of formulas and values corresponding to a formula-array. A set of formula-array representations is provided and arranged in a successive order. Each formula-array representation is evaluated for an associated memory requirement to support use thereof, followed by conversion to a structure of the formula-array representation at a successive level. Selection of the formula-array representation is determined based upon a minimal memory requirement from the formula-array representations in the order.

18 Claims, 4 Drawing Sheets

OBJECT TRANSFORMATION OF ARRAYS OF FORMULAS AND VALUES

BACKGROUND

This invention relates to reducing memory space required for storage of an array of formulas and corresponding arrays of values. More specifically, the invention relates to converting the array of formulas and values to a select array that attains a memory space reduction.

Modeling services, such as financial modeling, involve large numbers of arrays of data. Due to the size of these arrays, significant time is required to load or modify the arrays. To attain a high compute performance requires the data to be stored in memory. In some circumstances, the data is required to be stored in the form of formulas rather than specific data values, which only adds to the limitations associated with reaching a high compute performance. Accordingly, there is a need to represent the data and associated formulas in a compressed manner.

BRIEF SUMMARY

This invention comprises a method, system, and article for transforming representations of formula-arrays within a formula-array representation and calculating a memory requirement for each member representation.

In one aspect, a method is provided for reducing memory required to store an array of formulas and values corresponding to a formula-array. More specifically, a formula-array representation containing a set of formula-array representations is defined, with each formula-array representation representing an array of pairs, each comprising a formula and a value. In response to a requirement to reduce memory usage, data is converted and arranged according to a member of the defined set of formula-array representations to a select one of the formula-array representations that meets the reduced memory requirement. The process of converting the formula-array representations includes: data self-describing its organization, transforming the data organization into an organization for each member of the set of formula-array representations, calculating a memory requirement for each member of the set of formula-array representations, and selecting a data organization from one of the members calculated to require minimal memory.

In another aspect, a system is provided with tools to support transformation and replacement of a member of the formula-array representations. A processor is provided in communication with memory. A set of formula-array representations is defined, with each formula-array representation representing an array of pairs, each pair comprising both a formula and a value. A functional unit is provided in the system in communication with the memory. The functional unit is employed to convert data arranged according to a member of the defined set of formula-array representations to a select one of the formula-array representations meeting a reduced memory requirement. More specifically, the functional unit includes data self-describing its organization, a transformation manager to transform the data organization into an organization for each member of the set of formula-array representations, a memory manager in communication with the transformation manager, the memory manager to calculate a memory requirement for each member of the set of formula-array representations; and a selection manager in communication with the memory manager, the selection manager to select one of the data organizations determined to require minimal memory.

In a further aspect, a computer program product is provided and delivered as a service through a network connection. The computer program product includes a computer readable storage medium having computer readable program code embodied therewith to reduce memory required to store an array of formulas and a corresponding array of values. To support the functionality of the program product, computer readable program code is provided to define a set of formula-array representations. Each formula-array representation represents an array pair, with each pair including a formula and a value. In response to a requirement or suggestion to reduce memory, computer readable program code is provided to convert data arranged according to a member of the defined set of formula-array representations and to a select one of the formula-array representations that best meets the reduced memory requirement. More specifically, the code to convert the data arrangement includes: data self-describing its organization, transforming the data organization into an organization for each member of the set of formula-array representations, and calculating a memory requirement for each member of the set of formula-array representations. Once the conversions and associated memory requirement assessments are completed, an original data organization is selected with the selected data organization representing a member of the formula array representations calculated to require minimal memory.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
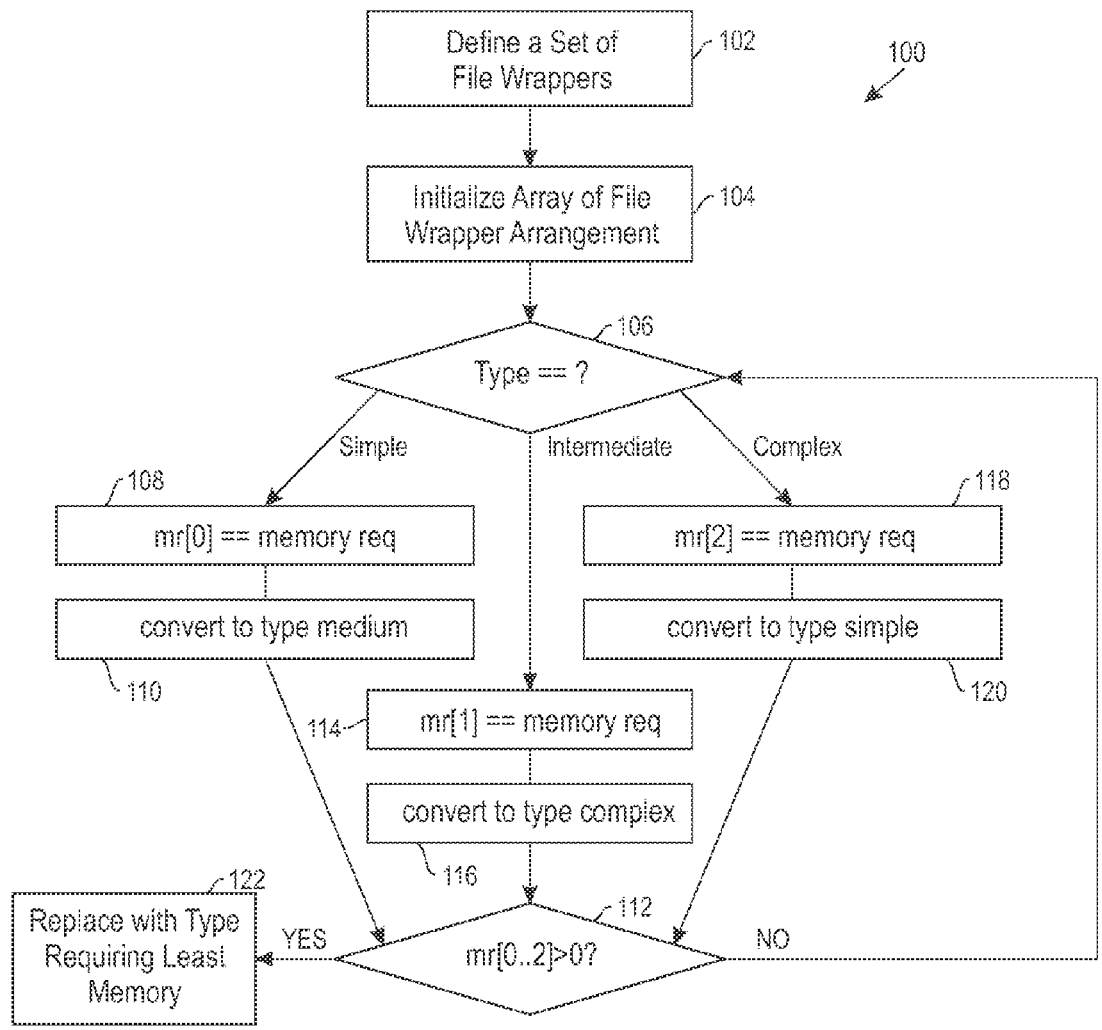
FIG. 1 depicts a flow chart illustrating a process for calculating a memory requirement for each representation, and for instituting the conversion of the representation to the different levels in the hierarchy.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

An array is a form of a data structure commonly used to store data. In one embodiment, an array may be employed to store a formula instead of a specific data value. A formula-array, also referred to herein as a representation, is described herein as an array that holds both formulas and data values simultaneously. For descriptive purposes, three basic representations are described, including a simple formula-array, an intermediate formula-array, and a complex formula-array. The following pseudo-code is an example of a simple representation:

```
Class Simple Formula Array {
Double v [ ]; //values
String m [ ]; //formulas
Double evaluate (string);
}
``` where v represents data values, m represents formulas, and double evaluate (string) is a function that receives a string as an input and generates a value as an output. Accordingly, as shown herein the simple formula representation is a non-complex representation of a formula-array that combines formulas with data values.

The following pseudo-code is an example of an intermediate complexity representation:

```
Class medium formula array {
Double v [ ]; //values
String m [ ]; //map from array positions to formulas expressed as a string
Double evaluate (string);
}
``` where v represents data value, m represents a mapping of data from positions within the array to formulas, and double evaluate (string) is a function that receives a string as an input and generates a value as an output. The mapping provided herein is a different interpretation from the simple representation, but provides the same result. For example, in one embodiment the mapping enables all the data values, v, to be evaluated simultaneously instead of sequentially. Accordingly, as shown herein the medium representation is a more complex representation than a simple representation that includes a mapping for data values combined with formulas.

The following pseudo-code is an example of a complex representation:

```
Class complex formula array {
Double v [ ]; //values
Short d [ ]; //index
String m [ ]; //map from index to formulas expressed as a string
Short p [ ]; //map from array positions to formulas via index d
Double evaluate (string);
}
``` where v is an array representing data value, d is an array representing an index, m represents an array mapping from the index array to formulas, p represents a double array mapping from positions to formulas by way of the index array, and double evaluate (string) is a function that receives a string as an input and generates a value as an output. The mapping provided herein is a different interpretation from both the simple and medium representations, but provides the same result. Accordingly, as shown herein the complex representation is a successive level of complexity for representation of a formula-array from a medium level of complexity, and includes a mapping for data values combined with formulas.

The three representations described above have been shown to have successive levels of complexity, including, simple, medium, and complex. Each of the wrapper levels are interchangeably employed to represent a combination of data values and formulas. More specifically, a process and system are described below for converting among these three defined representation structures, and more specifically replacing one representation structure with another representation structure to minimize memory requirements. For example, a simple representation structure may be replaced with a medium or complex representation structure, a medium representation structure may be replaced with a simple or complex representation structure, and a complex representation structure may be replaced with a simple or medium wrapper structure.

As shown above, the wrapper comprising three representations pertain to an array of formulas and associated array values. The representations are related in a hierarchical manner, with each level in the hierarchy pertaining to the same underlying computation. Each of the representations may have a different memory requirement for the same underlying mathematical computation, with the different memory requirements based upon the computation being undertaken. At the same time, due to the hierarchical relationship, each representation in one level in the hierarchy may be converted to a successive level in the hierarchy. By undertaking the conversion of the representations, the memory requirements may be computed for each level in the hierarchy as a basis of comparison as to which representation will minimize the memory requirement. Accordingly, a representation may be selected based upon a memory requirement analysis for each representation in the hierarchy.

FIG. 1 is a flow chart (100) illustrating a process for calculating a memory requirement for each representation, and for instituting the conversion of the representation to a different level in the hierarchy. Initially a set of representations are defined (102). For descriptive purposes, three representations will be defined and described. In one embodiment, the invention should not be limited to the quantity illustrated herein, as the quantity of representations may be expanded to include additional structures with each additional representation associated with a new tier in the hierarchy. Each defined representation has an associated measurement. An array of the representation measurements is initialized (104). In one embodiment, the process of initializing the array at step (104) assigns a zero value to each member of the measurement array. Accordingly, the memory requirement for each defined representation is initialized so as to attach a fresh recording of the memory requirement.

Following step (104), it is determined which representation in the hierarchy is being evaluated for the memory requirement associated with the computation (106). In the example shown herein, there are three categories of representation complexity, including a simple level, a medium level, and a complex level. The initial level can be any of the three defined levels. For purposes of description, the first level is assigned to the simple level. The memory requirement for the representation at the simple level in the hierarchy is computed (108). As the goal of the functionality herein is to calculate the memory requirement for each representation, following step (108) and based on the example herein, the representation at the simple level is converted to a corresponding representation at a medium level (110). Details of the conversion process from the simple representation structure to the medium representation structure are shown below in FIG. 2.

Following the conversion at step (110), it is determined if all the memory measurements have been computed for each representation (112). In our example, since the memory requirement has only been computed for the simple level representation, the process returns to step (106). Since the conversion to the medium level has taken place at step (110) but the memory has not been computed, the memory requirement for the representation at the medium level in the hierarchy is computed (114), followed by converting the medium level representation to the complex representation structure (116) and a return to the determination at step (112). Details of the conversion process from the medium representation structure to the complex representation structure are shown in pseudo code described below. A negative response to the determination at step (112) is followed by a return to step (106). In the example herein, the representation structure is now complex. As such, the memory requirement for the representation at the complex level in the hierarchy is computed (118). Since there are only three representation structures defined herein, the complex representation is converted to the simple representation (120). Details of the conversion from the complex to the simple are shown in pseudo code described below. Following the conversion, the process returns to step (112). Once all of the representations have had their respective memory requirements computed, the representation structure that minimizes the memory requirement is selected (122). More specifically, the representation that requires the smallest number of bytes is selected at step (122). Accordingly, as shown herein each representation structure for the same underlying array of formulas and values is evaluated for the memory requirement so that a direct comparison of the memory requirements may be performed.

Figure 2:
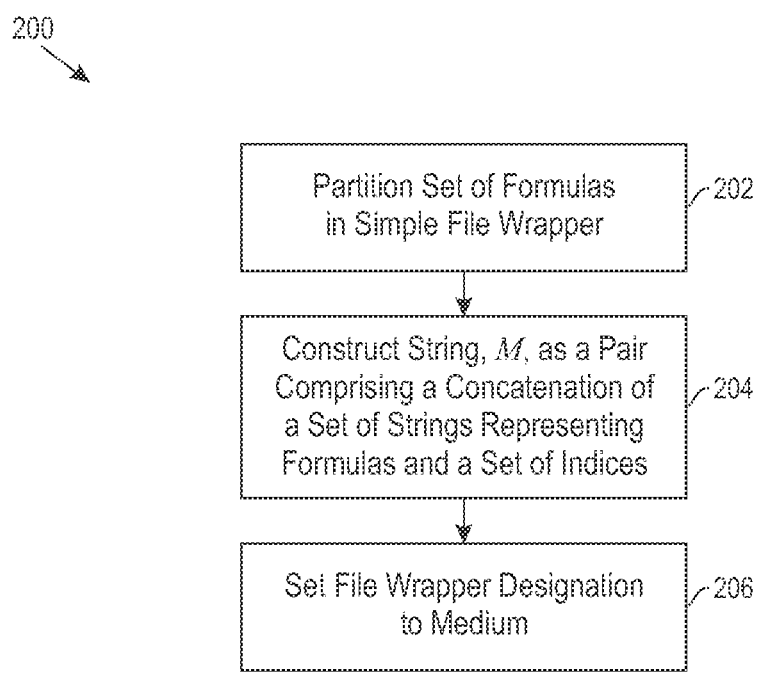
FIG. 2 depicts a flow chart illustrating a process for converting from a simple representation structure to a successive representation structure with a defined level of complexity.

As demonstrated in FIG. 1, each representation may be converted to a successive level representation. More specifically, the simple representation structure may be converted to the medium representation structure, the medium representation structure may be converted to the complex representation structure, and the complex representation structure may be converted to the simple representation structure. In one embodiment, there may be additional levels of representation structures, and the conversions thereof would follow in a parallel manner to that disclosed herein. FIG. 2 is a flow chart (200) illustrating a process for converting the simple representation structure to the medium representation structure. The set of formulas in the simple wrapper that vary by an index reference are partitioned (202). This partitioning enables the formula-array of values to be collected. Following the partitioning, a string m is constructed as a pair comprising a concatenation of a set of strings representing formulas and a set of indices (204). In one embodiment, each formula and associated set of indices is provided with a delimiter as a separation from adjacent formulas. For example the concatenation at step (204) may be as follows:

<set of formulas$_1$, set of indices$_1$><set of formulas$_2$, set of indices$_2$> etc.

Following the concatenation at step (204), the representation is now converted to a medium representation construction. The wrapper type is set to medium (206). Accordingly, the process of converting from a simple representation to a medium representation employs aspects of partitioning and concatenation.

As the levels of hierarchical representations grow, so does the aspect of conversion between adjacent representation levels. The following is pseudo code illustrating a process for converting a medium representation to a complex representation structure:

1. Initialize a formula count, t=0
2. Delete the first '<' in m/delete the first delimiter in the string of formulas/
3. Select the substring up to the first '><'
4. Parse the substring into a beginning substring b and a ',' and a set of positions c1 /where c1 represents a formula plus a set of indices/
5. Parse the substring b into a first substring b1 plus a set of positions c2 and a second substring b2 /this can only take place where the number of indices in c1 is equal to the number of indices in c2/
6. Delete the beginning substring b and the ',' and c1 and '><' from the string of formulas
7. Replace c2 in the beginning substring b by µ/µ it represents a one byte symbol for the replacement/
8. Concatenate the beginning substring b onto the new complex formatted string of formulas, n, and put the index of the first character of the first substring, b, in the positions of d corresponding to c1
9. Set p[t]=c2/set of map of array positions to the set of positions c2/
10. Increment t by 1

-continued

| | |
|---|---|
| 11. | Iterate steps 3 through 10 until there is no character '><' to satisfy step 3, in which case treat the substring up to the final '>' as the final substring for the iteration and delete the final '>' in place of the '><' in step 6. |
| 12. | Set the wrapper type to complex |

Following execution of the pseudo code shown above from the medium representation structure, the wrapper type is set to complex. Accordingly, the process of converting from a medium representation to a complex representation includes parsing the delimiters that are a part of the representation of the medium representation.

The complex representation structure is illustrated above. As shown, two new arrays are introduced in this structure. The complex representation structure is attained from the medium representation structure. The following is pseudo code illustrating a process for converting the complex representation to a simple representation structure:

| | |
|---|---|
| 1. | For a=0 to (length(d)-1) { /where is the index of iteration and the iteration takes place through the length of array d that is one of the new arrays built into the complex representation structure/ |
| 2. | If d[a] is maximal in d, then b-length of m/where m is a string of formulas/ |
| 3. | Else b = minimum element of d that is larger than d[a] |
| 4. | f = substring m(d[a],b) |
| 5. | i = number of distinct elements of d that are less than d[a] |
| 6. | j = number of elements of d that are equal to d[a] and to the left of d[a] |
| 7. | Replace each occurrence of μ in f by '['+ (string) p[i][j] +']' /where μ is a one byte symbol employed in the complex structure/ |
| 8. | m[a]= f } /new string array m is an array being created with length d for each formula/ |
| 9. | If each element of m is a constant, then replace m by[""] |
| 10. | Set the wrapper type to simple |
| 11. | Replace d and p by empty arrays |

The process of conversion among representation structures enables a memory requirement comparison to be performed with any of the representation structures as the original basis.

Figure 3:
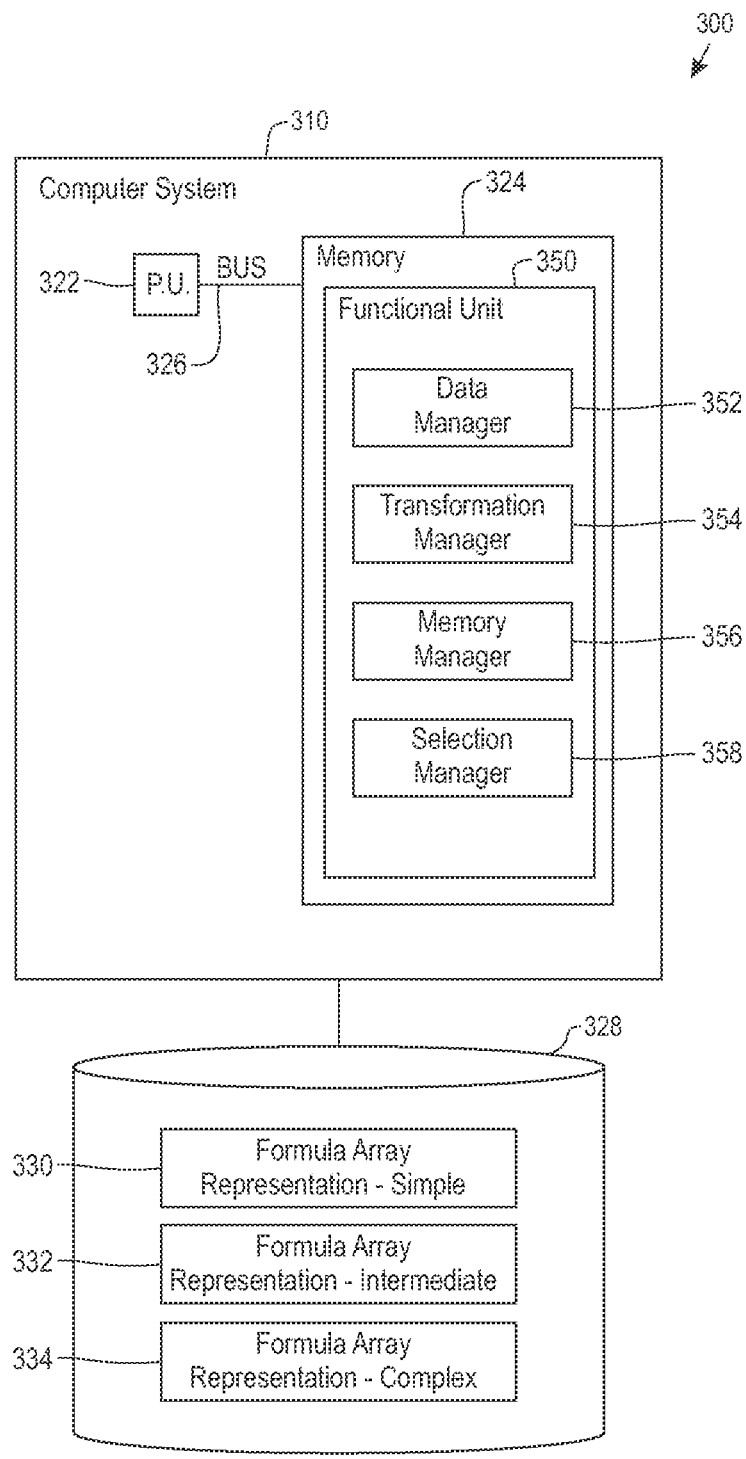
FIG. 3 depicts a block diagram illustrating tools embedded in a computer system to support the transformation and memory requirement assessment.

As demonstrated in the flow charts of FIGS. 1 and 2 and the pseudo code for converting a medium representation to a complex representation and a complex representation to a simple representation, the invention pertains to a wrapper combining the representation structures together with a method for converting among the representations to minimize memory requirements. In one embodiment, tools are provided to support the conversion, including transforming representation structures and ascertaining memory requirements for each structure. FIG. 3 is a block diagram (300) illustrating tools embedded in a computer system to support both the transformation and memory assessment of representations as described above. A computer system (310) is shown with a processing unit (322), in communication with memory (324) across a bus (326), and in communication with first local storage (328). In one embodiment, the computer system (310) may be in communication with one or more servers or client machines across a network.

A set of formula-array representations (330), (332), and (334) are provided in the local storage (328). In one embodiment, the formula-array representations (330)-(334) may be stored in memory local to the processor. Each formula-array representation (330)-(334) represents an array with a formula and a value. Several tools are provided to support reducing memory required to store an array of values corresponding to a formula-array. More specifically, a functional unit (350) is provided local to the computer system (310) and in communication with memory (324). The functional unit (350) manages the tools that support a reduction of memory allocation with respect to selection of a representation structure. More specifically, the functional unit (350) manages conversion of data arranged with a member of a defined set of formula-array representations to a select one of the formula-array representations that meets a reduced memory requirement. The tools include, but are not limited to a data manager (352), a transformation manager (354), a memory manager (356), and a selection manager (358). Accordingly, a plurality of tools is provided to facilitate memory evaluation and conversion among the formula-array representations.

The data manager (352) functions to describe the data organization. The transformation manager (354), in communication with the self-describing data manager (352), functions to transform the data organization into an organization for each memory of the set of formula-array representations. The memory manager (356) functions in communication with the transformation manager (354). More specifically, the memory manager (356) evaluates the formula-array representation to calculate a memory requirement. In one embodiment, the memory manager (356) performs the evaluation for each member of the set of formula-array representations, e.g. simple, medium, and complex. The selection manager (358) is provided in communication with the memory manager (356). The selection manager (358) functions to select and replace an original data organization with one that has been determined to require minimal memory. More specifically, the selection manager functions to replace a formula-array representation from one level in the hierarchy with a different formula-array representation in the hierarchy determined by the memory manager (356) to require less memory to support its computation. Accordingly, the data manager (352), transformation manager (354), memory manager (356), and selection manager (358) function together to mitigate memory usage by any one of the formula-array representations.

As illustrated above, the formula-array representations are arranged in a successive manner to enable conversion between each successive structure. More specifically, the transformation manager (354) conducts the transformation of the set of formula-array representations in a successive order, e.g. simple to medium, medium to complex, etc. In addition, the transformation manager (354) also conducts the transformation from a final formula-array representation in the successive order, e.g. complex, to a beginning formula-array representation in the successive order, e.g. simple. In one embodiment and as illustrated in FIG. 2 in detail, at least one of the formula-array representations within the set of formula-array representations has an array of offsets in a concatenation of formulas. Similarly, as shown in the pseudo-code above, at least one of the formula-array representations includes an array of arrays. In this disclosure, this structure was disclosed in the complex formula-array representation; in a formula-array representation having an array of arrays, each array correlates with a formula in the concatenation of formulas, as supported in the medium level formula-array representation. Accordingly, the structure of the formula-array representations enables the functionality of the transformation manager (354) and conversion among the successive arrangement of formula-array representations.

As shown herein, data self-describing its organization is provided in a manner that enables the transformation manager (354) to convert successively arranged formula-array representations, with the memory manager (356) assessing the memory requirement for each converted formula-array representation, and the selection manager (358) to effectively select the formula-array representation determined to require minimal memory to support associated computation(s). The managers (352)-(358) are shown as elements within the functional unit (350) local to the system (310). More specifically, the data, transformation, memory, and replacement managers, (352), (354), (356), and (358) respectively, are shown residing in memory (324) of the system (320). In one embodiment, the data, transformation, memory, and selection managers, (352), (354), (356), and (358) respectively, may reside as hardware tools external to memory (324) of the system (320), or they may be implemented as a combination of hardware and software. Similarly, in one embodiment, the managers (352)-(358) may be combined into a single functional item that incorporates the functionality of the separate items. As shown herein, each of the manager(s) are shown local to one computer system (320). However, in one embodiment they may be collectively or individually distributed across a shared pool of configurable computer resources and function as a unit to manage reducing memory required to store an array of values corresponding to a formula-array. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations, block diagrams, and/or pseudo code of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
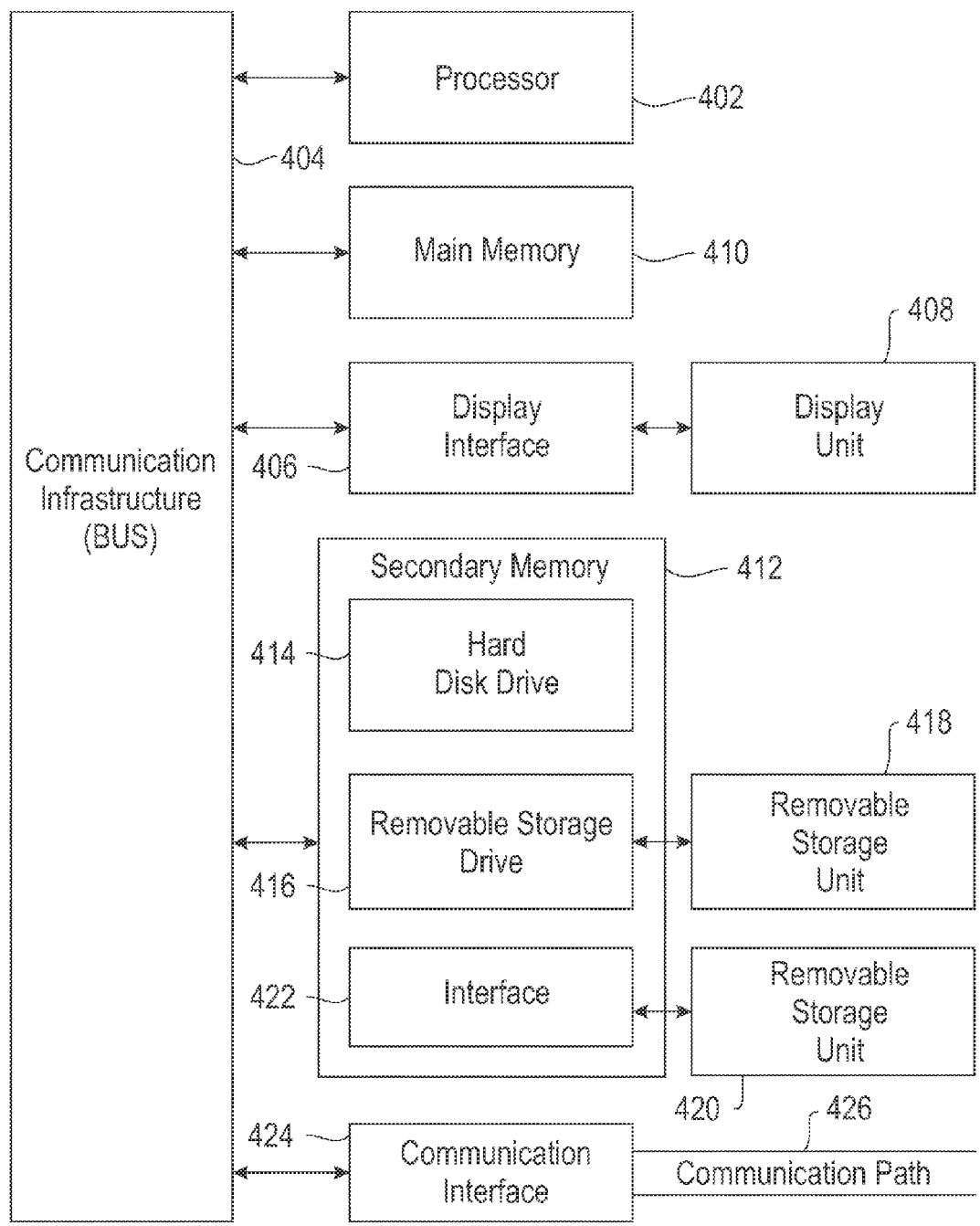
FIG. 4 depicts is a block diagram showing a system for implementing an embodiment of the present invention.

Referring now to FIG. 4, there is a block diagram (400) showing a system for implementing an embodiment of the present invention. The computer system includes one or more processors, such as a processor (402). The processor (402) is connected to a communication infrastructure (404) (e.g., a communications bus, cross-over bar, or network). The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, successive representation arrangements and associated transformation supports dynamic memory assessment, dynamic selection of one of the representations in the successive arrangement based on the assessed memory requirement.

ALTERNATIVE EMBODIMENT

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for reducing memory required to store an array of formulas and values corresponding to a formula-array comprising:

defining a set of formula-array representations, including an index array, each formula-array representation representing an array of pairs comprising a formula and a value;

responsive to a reduced memory requirement, converting data arranged according to a member of the defined set of formula-array representations to a select one of the formula-array representations meeting the reduced memory requirement, comprising:

data self-describing its organization;

transforming the data organization into an organization for each member of the set of formula-array representations;

calculating a memory requirement for each member of the set of formula-array representations; and selecting one of the data organizations with a select one of the members calculated to require minimal memory.

2. The method of claim 1, further comprising at least one formula-array representation within the set of formula-array representations having an array of offsets in a concatenation of formulas.

3. The method of claim 2, further comprising at least one formula-array representation including an array of arrays, with each array correlating with a formula in the concatenation of formulas.

4. The method of claim 1, wherein replacement of the original data organization occurs during run-time.

5. The method of claim 1, wherein transforming the data organization into an organization for each member of the set of formula-array representations is conducted in a successive order.

6. The method of claim 5, further comprising transforming a data organization from a final formula-array representation to a beginning formula-array representation.

7. A system comprising:
- a processor in communication with memory;
- a set of formula-array representations, including an index array, each formula-array representation to represent an array of pairs, each pair comprising a formula and a value;
- a functional unit in communication with the memory, the functional unit to convert data arranged according to a member of the defined set of formula-array representation to a select one of the formula-array representations meeting a reduced memory requirement, the functional unit comprising:
  - data self-describing its organization;
  - a transformation manager to transform the data organization into an organization for each member of the set of formula-array representations;
  - a memory manager in communication with the transformation manager, the memory manager to calculate a memory requirement for each member of the set of formula-array representations; and
  - a selection manager in communication with the memory manager, the selection manager to select and replace an original data organization with a select one of the members calculated to require minimal memory.

8. The system of claim 7, further comprising at least one formula-array representation within the set of formula-array representations having an array of offsets in a concatenation of formulas.

9. The system of claim 8, further comprising at least one formula-array representation including an array of arrays, with each array correlating with a formula in the concatenation of formulas.

10. The system of claim 7, wherein replacement of the original data organization occurs during run-time.

11. The system of claim 7, wherein the transformation manager conducts transformation of the data organization into an organization for each member of the set of formula-array representations in a successive order.

12. The system of claim 11, further comprising the transformation manager to transform from a final formula-array representation to a beginning formula-array representation.

13. A computer program product delivered as a service through a network connection, the computer program product comprising a computer readable storage medium having computer readable program code when executed on a processor to reduce memory required to store an array of formulas and a corresponding array of values, the computer readable program code comprising:
- computer readable program code to define a set of formula-array representations, including an index array, each formula-array representation representing an array of pairs, each pair comprising a formula and a value; and
- responsive to a reduced memory requirement, computer readable program code to convert data arranged according to a member of the defined set of formula-array representations to a select one of the formula-array representations meeting the reduced memory requirement, comprising:
  - data self-describing its organization;
  - transforming the data organization into an organization for each member of the set of formula-array representations;
  - calculating a memory requirement for each member of the set of formula-array representations; and
  - selection and replacing an original data organization with a select one of the members calculated to require minimal memory.

14. The computer program product of claim 13, further comprising at least one formula-array representation within the set of formula-array representations having an array of offsets in a concatenation of formulas.

15. The computer program product of claim 14, further comprising at least one formula-array representation including an array of arrays, with each array correlating with a formula in the concatenation of formulas.

16. The computer program product of claim 13, wherein selection and replacement of the original data organization occurs during run-time.

17. The computer program product of claim 13, wherein the code to transform the data organization into an organization for each member of the set of formula-array representations conducts the transformation for each member of the set of formula-array representations in a successive order.

18. The computer program product of claim 17, further comprising computer readable program code to transform from a final formula-array representation to a beginning formula-array representation.

* * * * *